US006030561A

United States Patent [19]

Sato et al.

[11] Patent Number: 6,030,561

[45] Date of Patent: Feb. 29, 2000

[54] METHODS FOR MAKING A LOUDSPEAKER VIBRATING DIAPHRAGM

[75] Inventors: Masatoshi Sato; Kunio Mitobe; Fumio Murayama; Jiro Nakazono, all of Yamagata-ken, Japan

[73] Assignees: Pioneer Electronics Corporation, Tokyo; Tohoku Pioneer Electronics Corporation, Tendo, both of Japan

[21] Appl. No.: 09/003,827

[22] Filed: Jan. 7, 1998

Related U.S. Application Data

[62] Division of application No. 08/887,055, Jul. 2, 1997, Pat. No. 5,793,002, which is a continuation of application No. 08/562,374, Nov. 22, 1995, abandoned.

[30] Foreign Application Priority Data

| | | | |
|---|---|---|---|
| Nov. 30, 1994 | [JP] | Japan | 6-297315 |
| Jun. 14, 1995 | [JP] | Japan | 7-147821 |
| Jun. 14, 1995 | [JP] | Japan | 7-147822 |

[51] Int. Cl.$^7$ .......... B29C 44/02

[52] U.S. Cl. .......... 264/51; 264/45.5

[58] Field of Search .......... 264/45.5, 328.7, 264/51

[56] References Cited

U.S. PATENT DOCUMENTS

| | | | |
|---|---|---|---|
| 3,767,742 | 10/1973 | Robin | 264/328.7 |
| 3,793,415 | 2/1974 | Smith | 264/46.4 |
| 3,809,733 | 5/1974 | Sandiford et al. | 264/328.7 |
| 3,834,486 | 9/1974 | Tsuge et al. . | |
| 4,395,597 | 7/1983 | Suzuki et al. . | |
| 4,410,768 | 10/1983 | Nakamura et al. . | |
| 4,478,309 | 10/1984 | Kawamura et al. . | |
| 5,252,269 | 10/1993 | Hara et al. | 264/45.5 |
| 5,281,376 | 1/1994 | Hara et al. | 264/328.7 |
| 5,292,465 | 3/1994 | Kobayashi et al. | 264/45.5 |
| 5,460,509 | 10/1995 | Sawafuji et al. . | |
| 5,547,621 | 8/1996 | Naritomi | 264/328.7 |
| 5,650,105 | 7/1997 | Yocum | 264/45.5 |
| 5,702,810 | 12/1997 | Koseki et al. | 264/45.5 |

FOREIGN PATENT DOCUMENTS

| | | | |
|---|---|---|---|
| 56-92038 | 7/1981 | Japan | 264/328.7 |

*Primary Examiner*—Allan R. Kuhns
*Attorney, Agent, or Firm*—Nikaido, Marmelstein, Murray & Oram LLP

[57] ABSTRACT

A method of producing a loudspeaker vibrating diaphragm comprising the steps of injecting an amount of resin containing a foaming agent into a metallic mold of an injection molding machine, the mold including a fixed part and a movable part, reducing a mold pressing force of the injection molding machine upon completion of the resin injection, so as to enlarge a space formed between the fixed part and the movable part by a predetermined distance, so that the foaming agent is foamed to obtain a foam layer in the diaphgram.

12 Claims, 12 Drawing Sheets

FIG.9

| MOLD OPENING TIMING (SEC.) | MOLD OPENING QUANTITY μm | NOT USING SHUTTER MECHANISM | | USING SHUTTER MECHANISM | | |
|---|---|---|---|---|---|---|
| | | PRODUCT WEIGHT g | FOAMING STATE | SHUTTER OPERATING TIMING (SEC.) | PRODUCT WEIGHT g | FOAMING STATE |
| | 0 | 4.7 | UNFOAMING | | | |
| 0.31 | 600 | 8.3 | GOOD | | | |
| 0.32 | 600 | 7.7 | GOOD | | | |
| 0.34 | 600 | 7.3 | GOOD | 0.31 | 4.8 | GOOD |
| 0.35 | 600 | 6.7 | GOOD | 0.31 | 4.9 | GOOD |
| 0.37 | 600 | 5.3 | GOOD | | | |
| 0.38 | 600 | 5.2 | UNSTABLE FOAMING | 0.31 | 4.8 | UNSTABLE FOAMING |
| 0.40 | 600 | 5.1 | BAD | | | |

FIG.10

| | CHANGES OF VARIOUS PHYSICAL PROPERTIES WITH FOAMING MAGNIFICATION | | | | | | | | | | | |
|---|---|---|---|---|---|---|---|---|---|---|---|---|
| FOAMING MAGNIFICATIN | 1.00 | 1.15 | 1.29 | 1.33 | 1.38 | 1.45 | 1.64 | 1.75 | 1.85 | 2.20 | 2.52 | 2.90 |
| SPECIFIC GRAVITY $g/cm^3$ | 0.93 | 0.81 | 0.72 | 0.70 | 0.68 | 0.64 | 0.57 | 0.53 | 0.50 | 0.42 | 0.37 | 0.32 |
| YOUNG'S MODULUS $E+9N/m^2$ | 4.30 | 4.01 | 3.60 | 3.42 | 3.33 | 3.22 | 3.16 | 3.02 | 3.00 | 2.90 | 2.75 | 2.30 |
| INTERNAL LOSS | 0.073 | 0.074 | 0.075 | 0.075 | 0.080 | 0.078 | 0.078 | 0.083 | 0.081 | 0.081 | 0.080 | 0.080 |
| THICKNESS mm | 0.30 | 0.35 | 0.39 | 0.40 | 0.41 | 0.44 | 0.49 | 0.53 | 0.56 | 0.66 | 0.76 | 0.87 |
| RIGIDITY | 0.68 | 0.97 | 1.23 | 1.28 | 1.39 | 1.56 | 2.21 | 2.57 | 3.02 | 4.90 | 6.99 | 8.91 |

METHODS FOR MAKING A LOUDSPEAKER VIBRATING DIAPHRAGM

CROSS REFERENCE TO RELATED APPLICATIONS

This application is a divisional of U.S. patent application Ser. No. 08/887,055, filed Jul. 2, 1997, U.S. Pat. No. 5,793,002 which is a continuation of application Ser. No. 08/562,374, filed Nov. 22, 1995, now abandoned. The subject matter of each of these applications is hereby incorporated by reference.

BACKGROUND OF THE INVENTION

This invention relates to a loudspeaker vibrating diaphragm and methods for manufacturing the same.

A material for use as a vibrating diaphragm in a loudspeaker is required to have a low density, a high Young's modulus, a high rigidity and an appropriate high internal loss.

A vibrating diaphragm made of an olefin resin is often used in a loudspeaker since it not only has an excellent water resistance and other environment resisting properties, but also has a good outside appearance and a good balance among various physical properties.

However, since the olefin resin has a specific gravity of 0.9 g/cm$^3$ which is higher than that of paper, a loudspeaker vibrating diaphragm made of the olefin resin has a low Young's modulus and a low rigidity.

Recently, in order to improve the intensity of a loudspeaker vibrating diaphragm, a carbon fiber has been suggested to be used as a filler to obtain the desired intensity. This however causes a further increase in density, resulting in a low sensitivity and causing difficulty when a sound having a high frequency is to be produced.

In order to solve the above problems, there has been suggested a method as shown in FIGS. 14(*a*) and 14(*b*). As illustrated in FIG. 14(*a*), a sheet 50 which is a foam material made of a polypropylene, is heated so as to become soft. Then, as illustrated in FIG. 14(*b*), the sheet 50 is formed into a vibrating diaphragm having a predetermined shape, by means of a metallic mold 23 and through a vacuum treatment. Besides, there is another method where a sheet which is the same as that in FIG. 14 is treated so as to form a desired shape in a heating/cooling pressing process.

However, a vibrating diaphragm produced in the above-related methods has a bad outside appearance since its foam layer is exposed. Moreover, since polypropylene material is exposed like a thin film to the surfaces of the sheet 50, the diaphragm itself is poor in its light resistance (for instance, ultraviolet rays).

In view of above, there has further been suggested an injection molding method where a vibrating diaphragm is directly formed with the use of an injection molding machine. In the injection molding method, a predetermined amount of resin containing a foaming agent is injected into a metallic mold, and a desired foaming process is caused to occur within the metallic mold. In order that the foaming agent can smoothly foam, a necessary space is required to form within the metallic mold. Usually, such a space for a foaming process is formed by first injecting a nitrogen gas into the metallic mold and then discharging the nitrogen gas. Another method of forming a necessary space for foaming is to inject a resin material into the cavity of a metallic mold in a manner called short-shot.

However, when a nitrogen gas is used to form a necessary space for foaming, the thickness of the resin injected in the metallic mold must be 4–5 mm or more, otherwise it will be difficult to achieve the desired foaming effect. On the other hand, if the necessary space for foaming is to be formed by injecting the resin material in the manner called short-shot, the thickness of the resin injected in the metallic mold must be 2–3 mm or more, otherwise foaming hardly occurs.

As a result, the injection molding methods, as above mentioned, can only be used to manufacture a product having a thickness of 2–3 mm or more. In fact, none of any known methods can be used to produce a thin foam product (preferably having a thickness of about 0.2–0.5 mm ) which can be used as a vibrating diaphragm in a loudspeaker.

SUMMARY OF THE INVENTION

An object of the present invention is to solve the above-mentioned problems peculiar to the above-mentioned prior art so as to provide an improved loudspeaker vibrating diaphragm which is light in weight, high in rigidity, has a small thickness, an appropriate internal loss and a good environment resistance.

According to the first aspect of present invention, there is provided a loudspeaker vibrating diaphragm formed by injecting an amount of resin containing a foaming agent into a metallic mold of an injection molding machine, the diaphragm comprising a foam layer and two un-foamed skin layers formed on both sides of the foam layer. In such a vibrating diaphragm, the average foaming magnification including the foam layer and two un-foamed skin layers is 1.1–3.0, and the foam layer contains foaming bubble cells which are formed with their longer axes arranged in the thickness direction of the diaphragm. Further, the thickness of each un-foamed skin layer is 0.05–0.20 mm.

According to the second aspect of present invention, there is provided a method of producing a loudspeaker vibrating diaphragm, which method comprises the steps of injecting an amount of resin containing a foaming agent into a metallic mold of an injection molding machine, said mold including a fixed part and a movable part, reducing a mold pressing force of the injection molding machine upon completion of the resin injection, so as to enlarge a space formed between the fixed part and the movable part by a predetermined distance, and causing the foaming agent to foam so as to obtain a foam layer of the diaphragm.

According to the third aspect of present invention, there is provided another method of producing a loudspeaker vibrating diaphragm, which method comprises the steps of injecting an amount of resin containing a foaming agent into a metallic mold of an injection molding machine, said mold including a fixed part and a movable part, stopping the flowing of the resin into the metallic mold upon completion of the resin injection, reducing a mold pressing force of the injection molding machine upon completion of the resin injection, so as to enlarge a space formed between the fixed part and the movable part by a predetermined distance, and causing the foaming agent to foam so as to obtain a foam layer of the diaphragm.

In both the second and third aspects of the present invention, the space formed between the fixed part and the movable part of the metallic mold is enlarged by a distance of 0.1–1.5 mm at a speed of 0.001 mm/ms.

The above objects and features of the present invention will become more understood from the following description with reference to the accompanying drawings.

BRIEF DESCRIPTION OF THE DRAWINGS

FIG. 9 is a table indicating differences between a case where the injection molding machine of FIG. 1 is used and a case where the injection molding machine of FIG. 5 is used.

FIG. 10 is a table indicating how various physical properties of the diaphragm of FIG. 1 changes with the foaming magnification thereof.

DETAILED DESCRIPTION OF THE PREFERRED EMBODIMENTS

Figure 1:
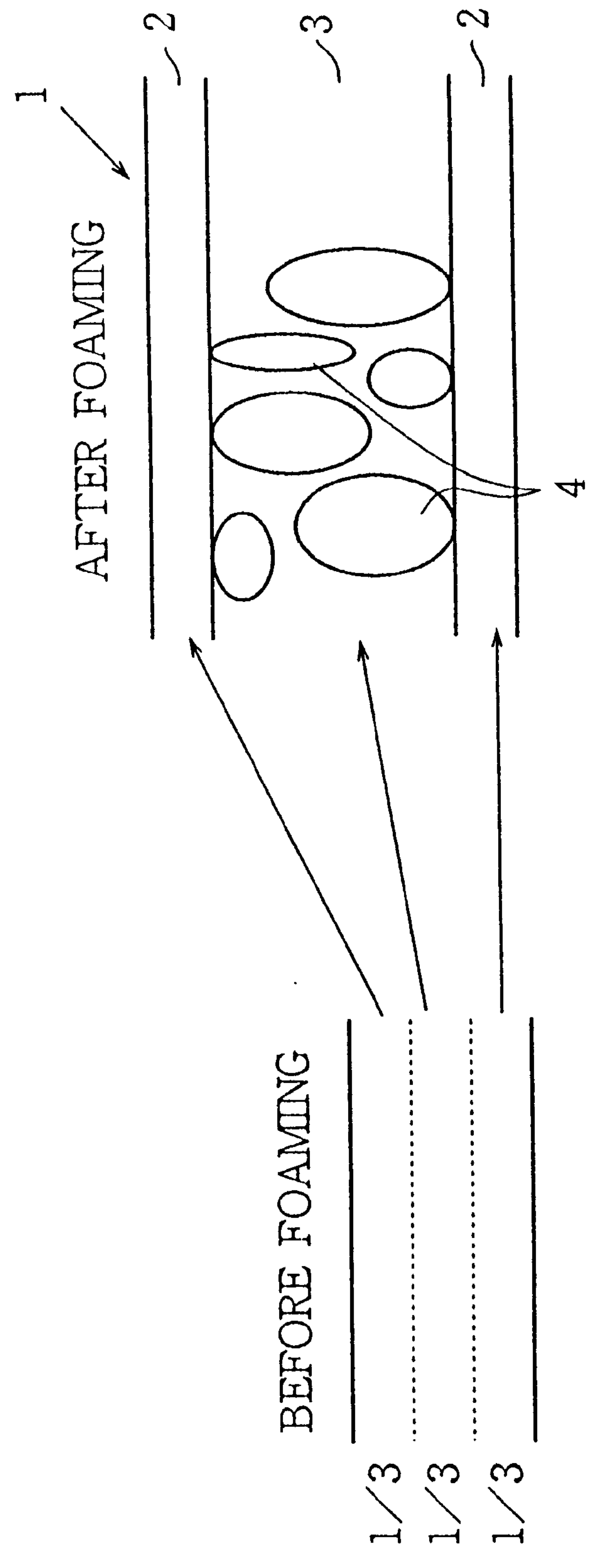
FIG. 1 is a schematic view showing a loudspeaker vibrating diaphragm according to the present invention.

Referring to FIG. 1, a loudspeaker vibrating diaphragm 1 according to the present invention, comprises a foam layer 3 and two un-foamed skin layers 2, 2 formed on both sides of the foam layer 3. Such a vibrating diaphragm 1 is manufactured by injecting an amount of polypropylene resin containing a foaming agent into a metallic mold, then causing the foaming agent to foam within the mold. The two un-foamed skin layers 2, 2 are usually formed due to an early solidification of the resin before the foaming of the resin injected therein.

In such a vibrating diaphragm 1, the average foaming magnification including the foam layer 3 and two un-foamed skin layers 2, 2 is controlled at a range of 1.1–3.0. The average foaming magnification is the ratio of the thickness of the resin after foaming (which equals the sum of the thicknesses of the foamed layer and the two un-foamed layers) to the thickness of the resin before foaming. That is, the expansion ratio of the thickness of the foamed material to the pre-foamed material is in the particular range. An example is shown diagrammatically in FIG. 1. If the average foaming magnification is lower than 1.1, it will be difficult to obtain a desired rigidity and a desired internal loss. On the other hand, if the average foaming magnification is higher than 3.0, foaming bubble cells will become too large in size, making it difficult to obtain an uniform foaming state, hence various physical properties of the manufactured vibrating diaphragms will vary significantly from one diaphragm to another.

In addition, the foam layer 3 contains foaming bubble cells 4 which are formed with their longer axes arranged in the thickness direction of the diaphragm 1. Having the foaming bubble cells 4 formed with their longer axes arranged in the thickness direction of the diaphragm 1, the two un-foamed skin layers 2, 2 may be reinforced, so that a deterioration of the Young's modulus may be avoided, and the rigidity of the diaphragm itself is improved.

Further, the vibrating diaphragm 1 has a total thickness of 0.17–1.8 mm, whilst each un-foamed skin layers 2 has a thickness of 0.05–0.20 mm. Keeping the thickness of the skin layer 2 at 0.05–0.20 mm, it allows production of a vibrating diaphragm light in weight and high in rigidity. In practice, as long as the integrity of the diaphragm is ensured, the thickness of the un-foamed skin layers 2, 2 should be made as small as possible. If the thickness of the un-foamed skin layers 2,2 is larger than 0.20 mm, the foam layer 3 will have a reduced thickness and hence it will become difficult to obtain the desired foaming magnification of 1.1–3.0.

In addition, a preferred thickness of an un-foamed skin layer 2 should be a thickness corresponding to about ⅓ of the resin thickness before foaming, as shown in FIG. 1.

Figure 2:
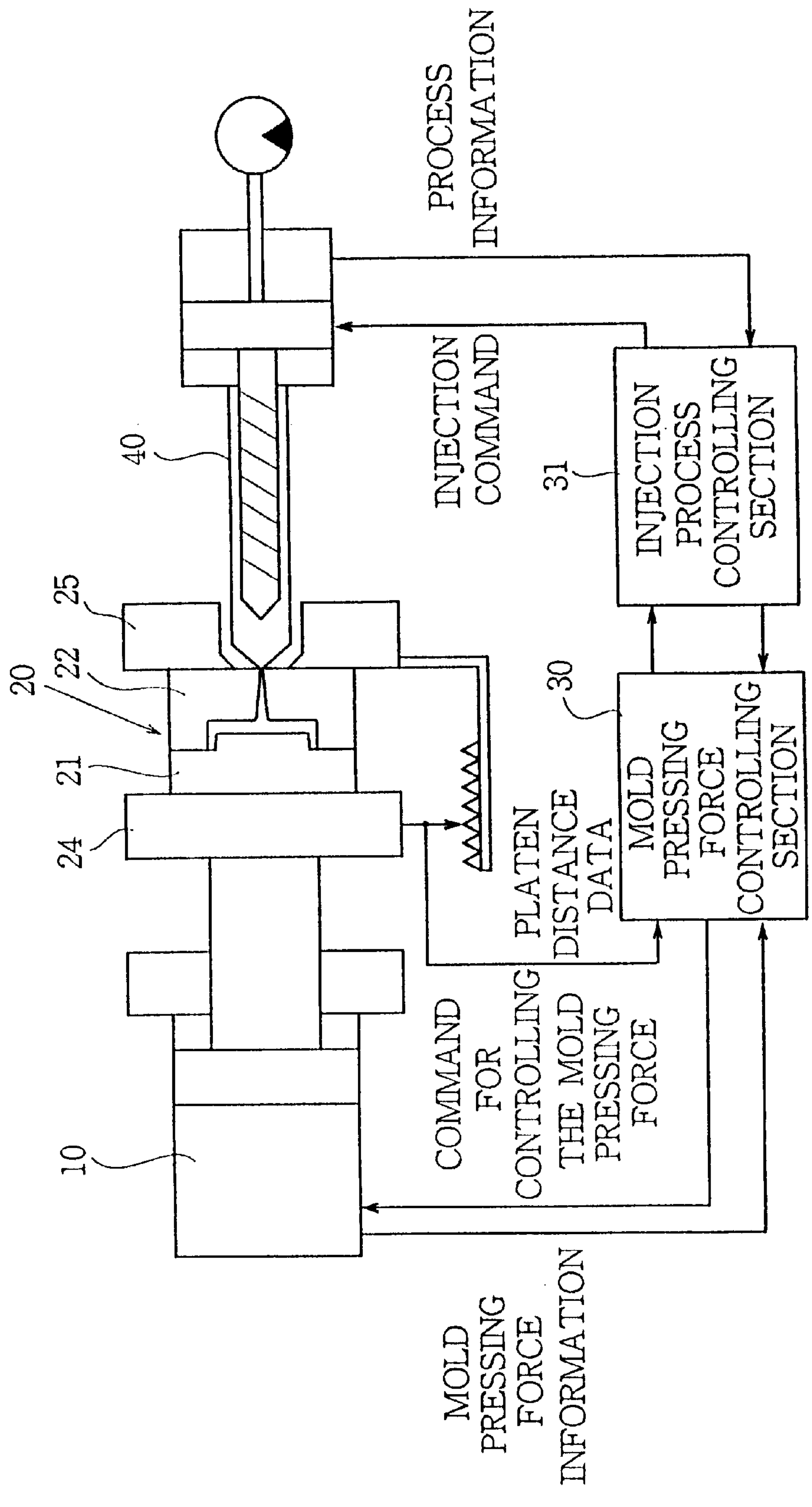
FIG. 2 is a schematic view showing an injection molding machine for producing the diaphragm of FIG. 1.

FIG. 2 illustrates an injection molding machine in which the loudspeaker vibrating diaphragm 1 of FIG. 1 is manufactured.

Referring to FIG. 2, the injection molding machine has a metallic mold 20 which includes a movable part 21 held on a movable platen 24 and a fixed part 22 held on a fixed platen 25. A mold pressing force produced by moving the movable part 21 toward the fixed part 22, is controlled by a pressing cylinder 10 which is in turn controlled by a mold pressing force controlling section 30.

An injection device 40 is arranged such that its ejecting mouth is inserted in the injecting mouth of the fixed part 22. An amount of polypropylene resin containing a foaming agent (10% by weight) is in advance injected in the device 40. The injection of the resin from the device 40 is controlled by an injection command from an injection process controlling section 31 which receives a process information from the device 40. The process information is further fed to the mold pressing force controlling section 30. On the other hand, a distance data is fed to the mold pressing force controlling section 30 from the movable platen 24. Meanwhile, the mold pressing force controlling section 30 receives a mold pressing force information from the pressing cylinder 10 and produces a command to the cylinder 10 for controlling the mold pressing force. Therefore, the mold pressing force of the machine may be controlled by the mold pressing force controlling section 30.

A method of producing a loudspeaker vibrating diaphragm 1 of FIG. 1 with the use of the injection molding machine of FIG. 2 will be described in detail below.

Figure 3:
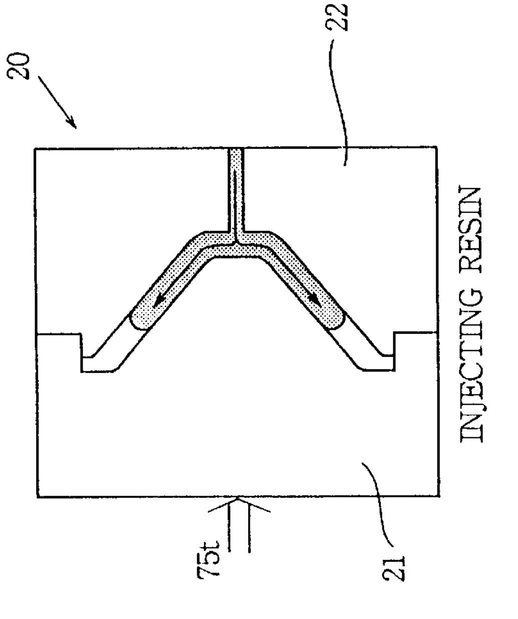
FIGS. 3(*a*)–3(*c*) are explanatory views showing a method of producing the diaphragm of FIG. 1, using the injection molding machine of FIG. 2.
Figure 3:
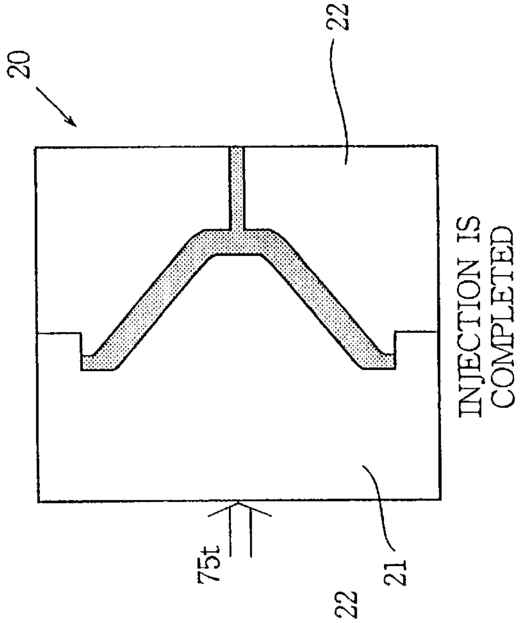
Figure 3:
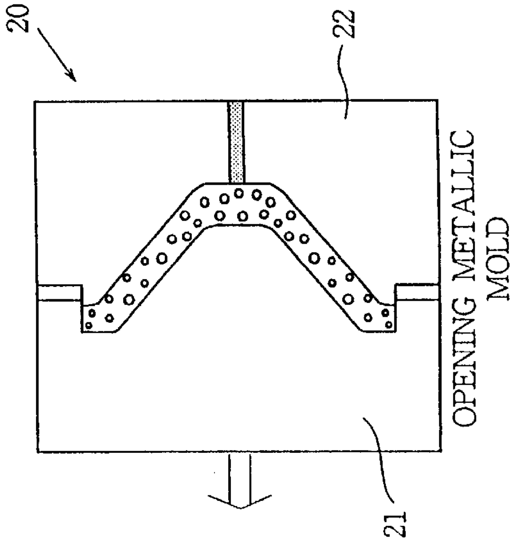

Referring to FIG. 3(*a*), the pressing cylinder 10 is operated to move the movable part 21 so that the metallic mold 20 is closed. Then, an amount of polypropylene resin containing a foaming agent (10% by weight) is injected into the cavity of the mold 20 from the injection device 40. At this time, the temperature within the cylinder 10 is maintained at about 200° C., and the internal surface of the cavity of the mold 20 is kept at a temperature of about 90° C. Further, a pressing force of the pressing cylinder 10 is controlled at about 75 tons by the mold pressing force controlling section 30, and a thickness of the cavity formed between the movable part 21 and the fixed part 22 is kept at 0.3 mm.

Referring to FIG. 3(*b*), the resin injected in the cavity of the mold 20 begins to produce skin layers 2, 2 in contact with the internal wall of the cavity. At this moment, the melt portion of the resin receives two kinds of forces, one is an injecting force from the injection device 40, and the other is a mold pressing force produced by moving the movable part 21 toward the fixed part 22. As a result, the resin is under a quite large pressure. If the condition as shown in FIG. 3(*b*) is not changed, bubbles of a gas generated by the decomposition of the foaming agent will be compressed so that a desired foaming does not occur. Consequently, the whole amount of the injected resin will soon solidify without sufficient foaming reaction.

Now, referring to FIG. 3(*c*), upon the completion of the resin injection and while a foaming pressure of the foaming agent within the melt portion of the injected resin is still capable of expanding the skin layers 2, 2, the mold pressing force caused by the pressing cylinder 10 is suddenly lowered to approximately 0 ton (i.e., the mold 20 is suddenly opened a little by moving its movable part 21 leftwardly in FIG. 3 (*c*)), through the control of the mold pressing force controlling section 30. The sudden dropping of the mold pressing force permits the compressed bubbles of the decomposition gas of the foaming agent to expand the surrounding resin, so that the desired foaming reaction occurs.

In order to perform the aforesaid operation, a timing for suddenly lowering the mold pressing force (i.e., the mold 20 is suddenly opened a little by moving its movable part 21 leftwardly in FIG. 3 (*c*)) is extremely important and will be explained hereinafter in detail.

Namely, if the mold 20 is opened before the completion of the resin injection, there will be too much of resin to be injected into the cavity formed between the movable part 21 and the fixed part 22, resulting in a product heavy in weight. On the other hand, if the mold 20 is opened too late, the solidification of the resin will proceed too much before the foaming occurs, resulting in a product without a foam layer. As a conclusion of many experiments, preferably the mold 20 is opened 0.3–0.8 seconds after the beginning of the resin injection. However in practice, a timing for opening the mold 20 shall be determined in accordance with the temperature of the resin, the temperature of the mold 20, the thickness of a diaphragm to be produced, and the amount of the foaming agent added in the resin.

Further, since it is necessary to open the mold 20 by a distance of about 0.1–1.5 mm within an extremely short time period of 0.04–0.05 seconds, the movable part 21 of the mold 20 should be moved leftwardly at a speed of 0.0020–0.0375 mm/ms. In a case where vibrating diaphragm of a thin type is to be produced, a speed of 0.001 mm/ms or more is sufficient for opening the mold 20 in the same manner as described above.

Besides, it is also possible to provide a spring means (not shown) between the movable part 21 and the fixed part 22 of the mold 20, so as to increase an opening force of the movable part 21 when the mold pressing force of the machine is suddenly dropped. In this way, the foaming magnification of the resin can be further increased.

Figure 4:
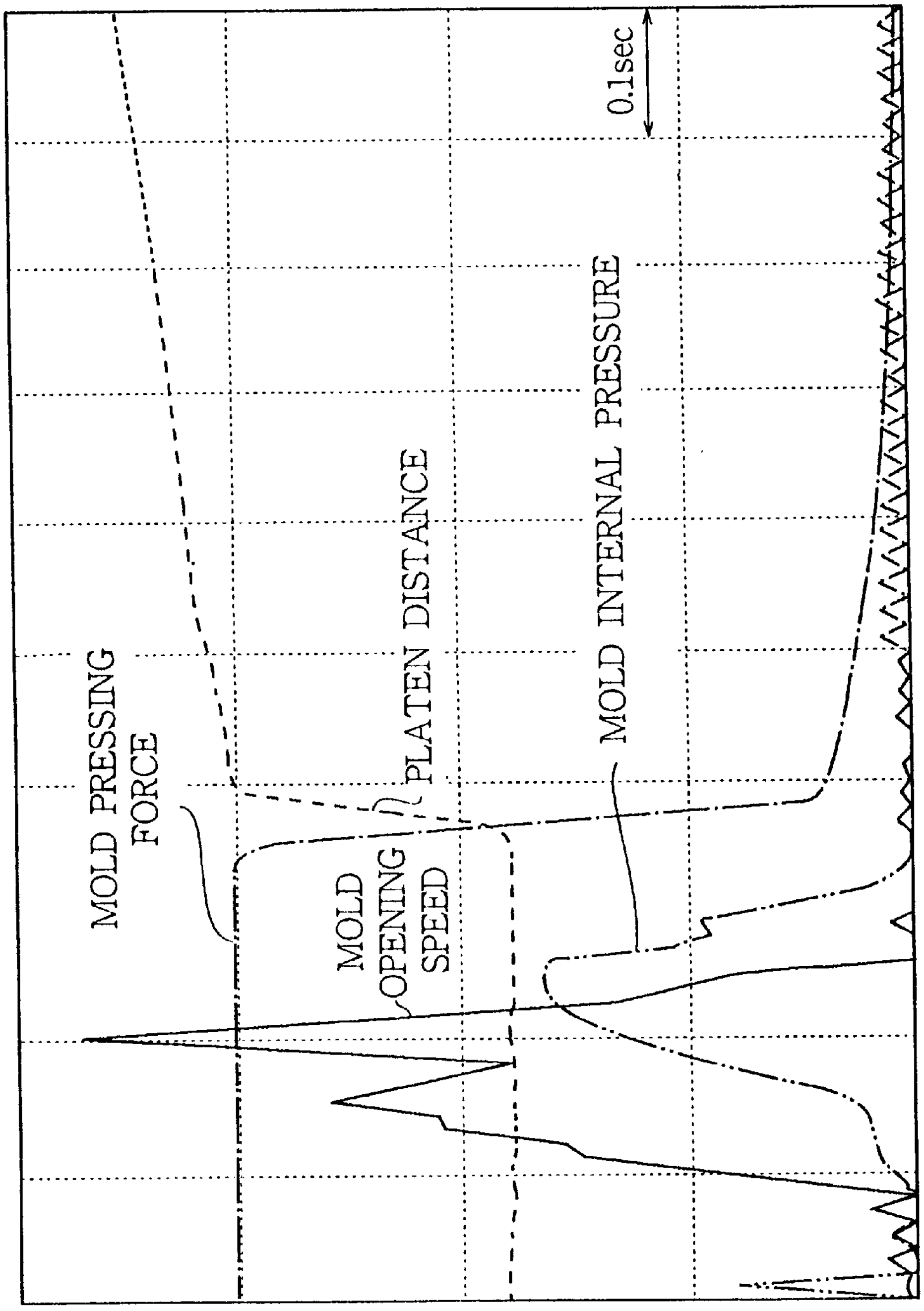
FIG. 4 is a graph showing various operational characteristics of the injection molding machine of FIG. 2.

FIG. 4 is a graph showing various operational characteristics of the injection molding machine used in the above-described method.

FIGS. 5–9 illustrate a further improved method of producing a loudspeaker vibrating diaphragm of FIG. 1.

Figure 5:
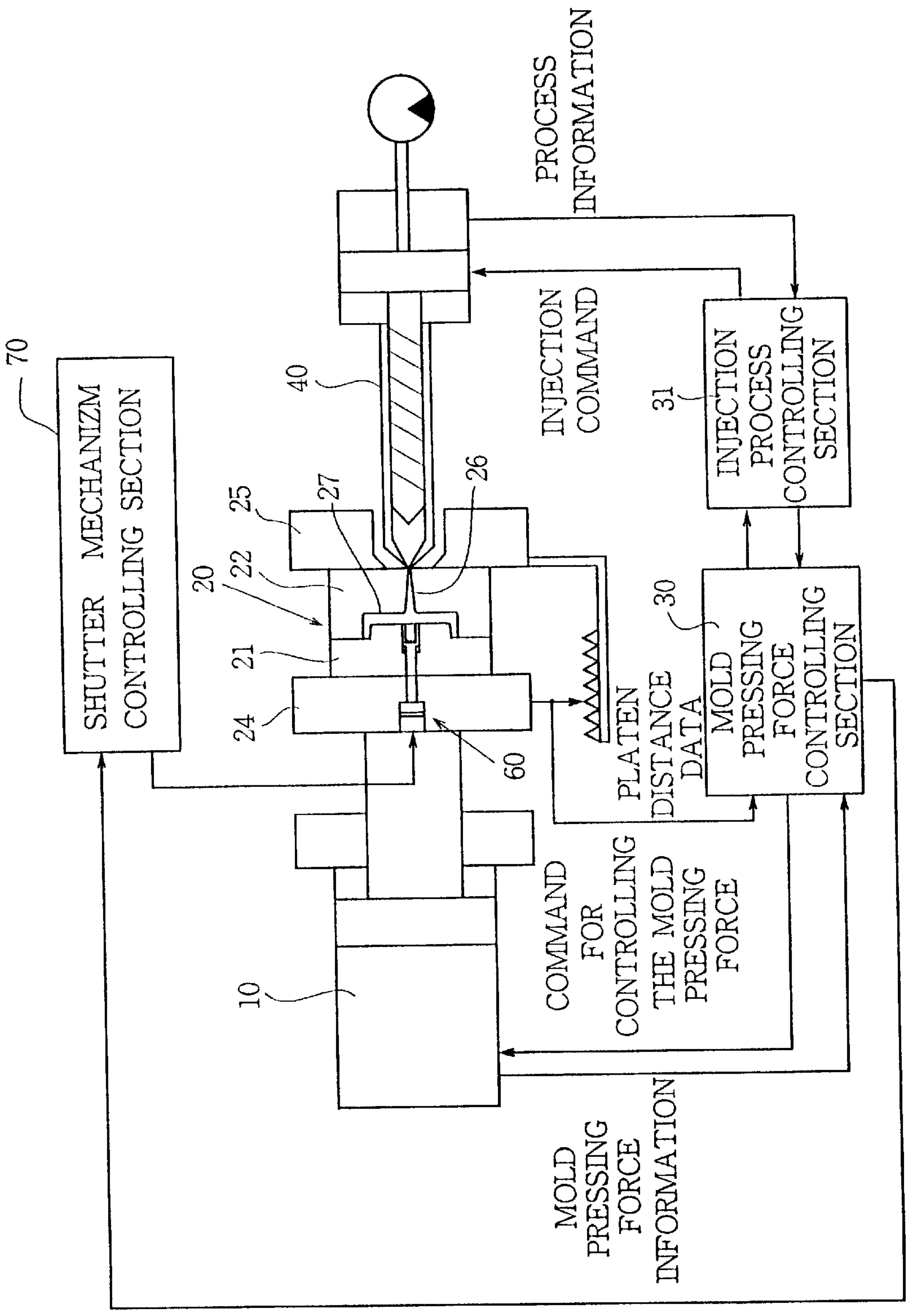
FIG. 5 is a schematic view showing an injection molding machine improved in the construction thereof.

Referring to FIG. 5. an injection molding machine used in this method is almost the same as that shown in FIG. 2, except that a shutter mechanism 60 and a shutter mechanism controlling section 70 are provided.

According to this further improved method, upon the completion of the resin injection, the shutter mechanism 60 is driven rightwardly in FIG. 5, through the control of the shutter mechanism controlling section 70. In this way, by moving the shutter mechanism 60 rightwardly to get its front portion in tight contact with the internal surface of the fixed part 22, a continuing flow of the resin into a product portion 28 (FIGS. 6–8) can be stopped at the expense of killing a part of the gate area 27 surrounding the injecting mouth of the fixed part 22.

A method of producing a loudspeaker vibrating diaphragm of FIG. 1 with the use of the injection molding machine of FIG. 5 will be described in detail below.

Figure 6:
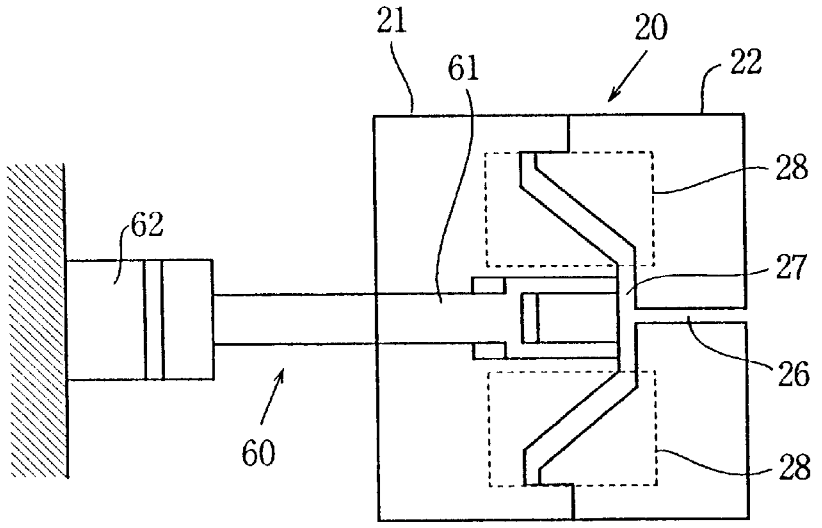
FIGS. 6–8 are explanatory views showing another method for producing the diaphragm of FIG. 1, using the injection molding machine of FIG. 5.

Referring to FIG. 6, the pressing cylinder 10 (FIG. 5) is operated to move the movable part 21 so that the metallic mold 20 is closed. Then, an amount of polypropylene resin containing a foaming agent (10% by weight) is injected into the cavity of the mold 20. At this time, the temperature within the cylinder 10 is maintained at about 230° C., and the internal surface of the cavity of the mold 20 is kept at a temperature of about 95° C. Further, a pressing force of the pressing cylinder 10 is controlled at 75 about tons by the mold pressing force controlling section 30, and a thickness of the cavity formed between the movable part 21 and the fixed part 22 is kept at 0.25 mm.

The resin injected in the cavity of the mold 20 begins to produce skin layers 2, 2 in contact with the internal wall of the cavity. At this moment, the melt portion of the resin receives two kinds of forces, one is an injecting force from the injection device 40, and the other is a mold pressing force produced by moving the movable part 21 toward the fixed part 22. As a result, the resin is under a quite large pressure. If the condition as shown in FIG. 6 is not changed, bubbles of a gas generated by the decomposition of the foaming agent will be compressed so that a desired foaming does not occur.

Figure 7:
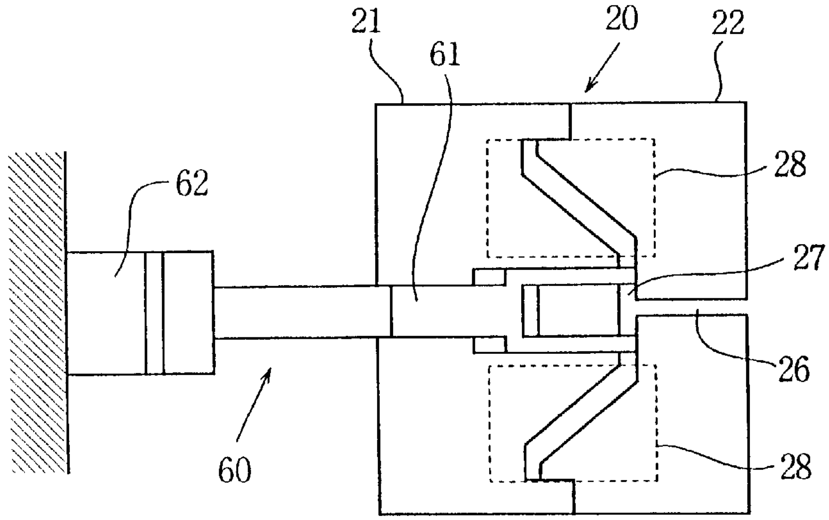

Referring to FIG. 7, upon completion of the resin injection, the shutter mechanism controlling section 70 (FIG. 5) operates to drive a shutter driving cylinder 62 of the shutter mechanism 60. In this way, a cylinder member 61 is moved rightwardly so that its front portion becomes in tight contact with the internal surface of the fixed part 22. Therefore, the resin flowing through a sprue 26 can be prevented from further flowing into the product portion 28.

Figure 8:
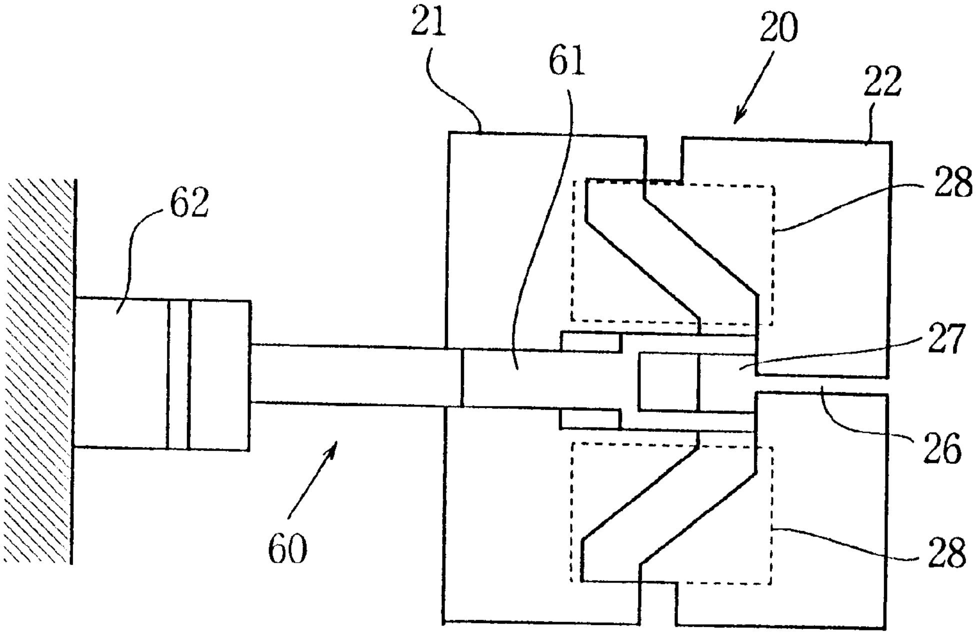

Referring to FIG. 8, when a foaming pressure of the foaming agent within the melt portion of the injected resin is still capable of expanding the skin layers 2, 2, the mold pressing force caused by the pressing cylinder 10 is suddenly lowered to approximately 0 ton (i.e., the mold 20 is suddenly opened a little by moving its movable part 21 leftwardly in FIG. 8), through the control of the mold pressing force controlling section 30. The sudden dropping of the mold pressing force permits the compressed bubbles of the decomposition gas of the foaming agent to expand the surrounding resin, so that the desired foaming occurs.

FIG. 9 is a table indicating differences between a case where the shutter mechanism 60 is used and a case where no such shutter mechanism is used. In the table shown in FIG. 9, mold opening timing (sec.) and shutter mechanism operating timing (sec.) are all defined as counting from the beginning of the resin injection.

As understood from FIG. 9, if the metallic mold 20 is opened at a timing of 0.31–0.37 seconds after the beginning of the resin injection, the foaming states of resin products are recognized to be good and acceptable. But, if the shutter mechanism 60 is not used, the resin products (loudspeaker vibrating diaphragm) will have different weights (5.3–8.3 g) from one to another. The reason for this phenomenon can be described as follows. Namely, when a timing for opening the mold 20 is too early, there will be unnecessarily larger amount of resin flowing into the mold 20, resulting in a heavy product (loudspeaker vibrating diaphragm). On the other hand, when a timing for opening the mold 20 is too late, the solidification of the injected resin will proceed too much, resulting in a product which is not sufficiently foamed. In contrast to this, when the shutter mechanism 60 is used, the resin products (loudspeaker vibrating diaphragm) will have almost the same weight. For instance, as indicated in FIG. 9, when the shutter mechanism 60 is operated at a timing of 0.34–0.38 seconds after the beginning of the resin injection, the resin products (loudspeaker vibrating diaphragm) have almost the same weight (4.8–4.9 g).

Further, since it is necessary to open the mold 20 by a distance of about 0.1–1.5 mm within an extremely short time period of 0.04–0.05 seconds, the movable part 21 of the mold 20 should be moved leftwardly at a speed of 0.0020–0.0375 mm/ms. In a case where a vibrating diaphragm of a thin type is to be produced, a speed of 0.001 mm/ms or more is sufficient for opening the sold 20 in the same manner as described above.

Besides, it is also possible to provide a spring means (not shown) between the movable part 21 and the fixed part 22 of the mold 20, so as to increase an opening force of the movable part 21 when the mold pressing force of the machine is suddenly dropped. In this way, the foaming magnification of the resin can be further increased.

Various operational characteristics of the injection molding machine of FIG. 5 is the same as that shown in FIG. 4.

FIGS. 10–13 indicate changes of various physical properties of the products (loudspeaker vibrating diaphragm) with the foaming magnification.

As indicated in the table of FIG. 10, although the Young's modulus becomes lower with the increase of the foaming magnification, the specific gravity of a vibrating diagragm becomes lower and this is advantageous to a loudspeaker vibrating diaphragm. In addition, with the increase of the foaming magnification, the rigidity thereof becomes higher, which is also advantageous to a loudspeaker vibrating diaphragm.

Figure 11:
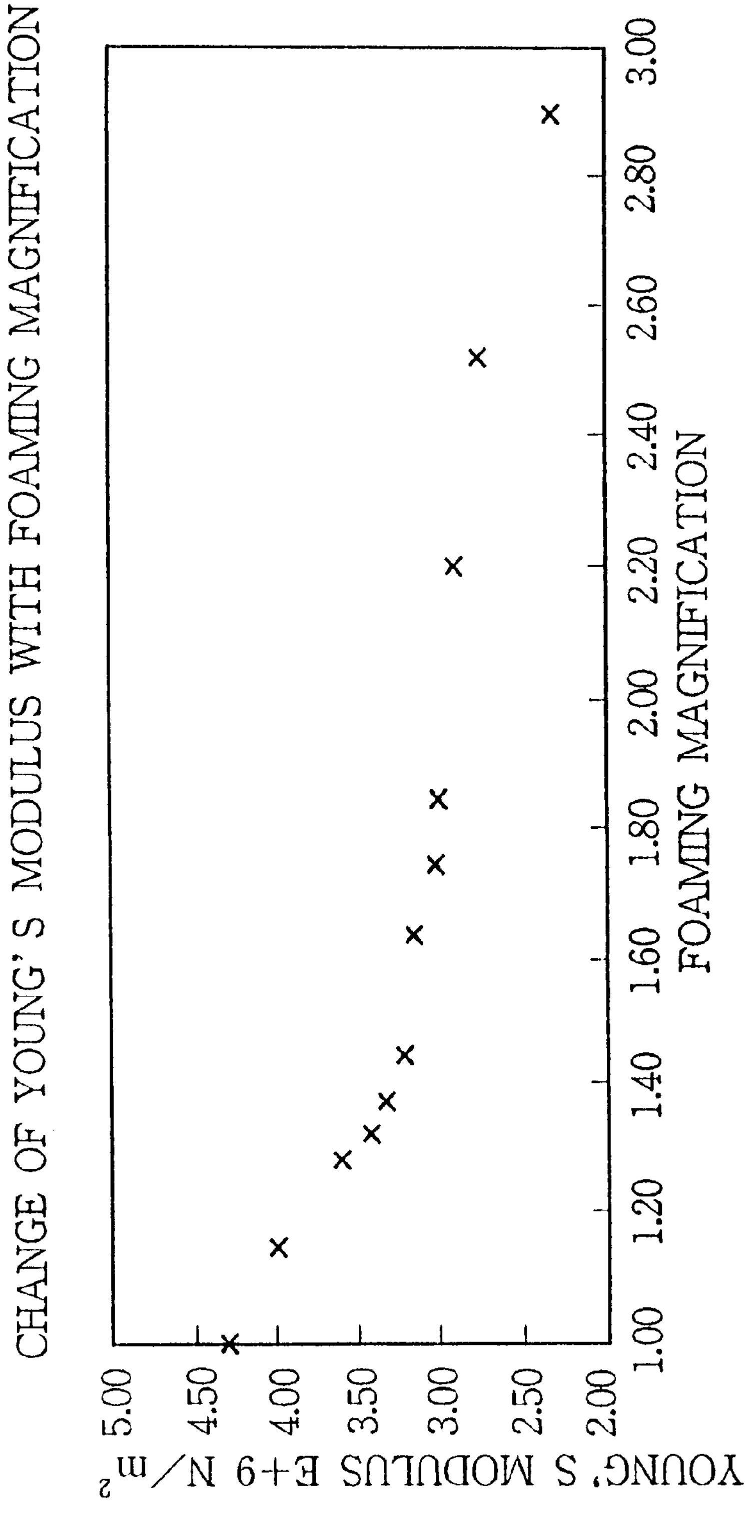
FIG. 11 is a graph indicating how the Young's modulus of the diaphragm of FIG. 1 changes with the foaming magnification thereof.
Figure 13:
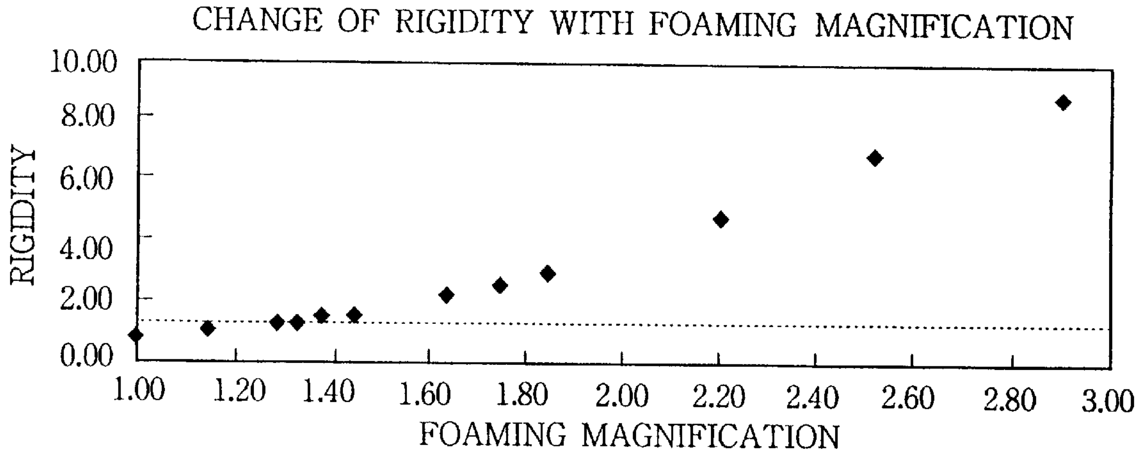
FIG. 13 is a graph indicating how the rigidity of the diaphragm of FIG. 1 changes with the foaming magnification thereof.
Figure 14:
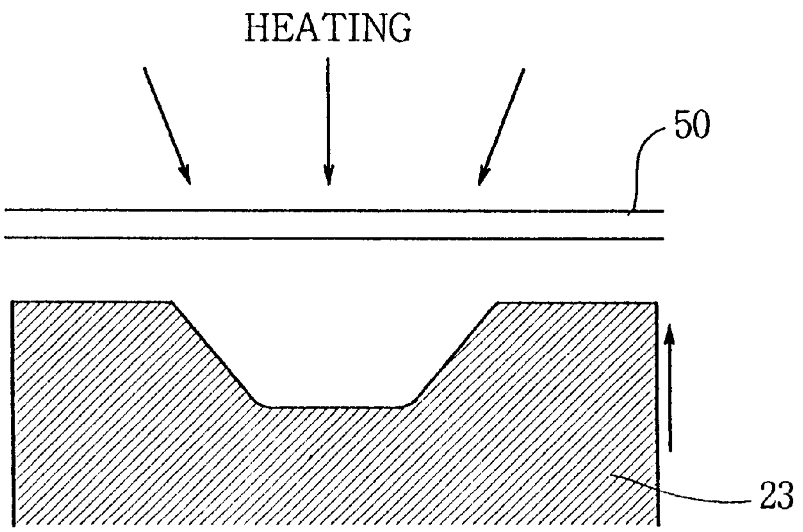
FIG.14 (a) PRIOR ART
FIGS. 14(*a*) and 14(*b*) are explanatory views showing a conventional method of producing a vibrating diaphragm for use in a loudspeaker.
Figure 14:
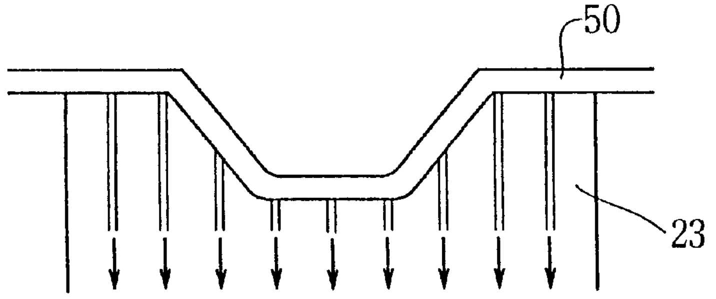

As indicated in FIGS. 11 and 13, after the foaming magnification becomes 1.5 or more, the decreasing of Young's modulus becomes slower and the rigidity thereof suddenly becomes higher.

Further, as indicated in FIGS. 11 and 13, after the foaming magnification becomes 2.5 or more, the decreasing of Young'modulus becomes quicker and the increasing of rigidity becomes irregular and difficult to control.

In view of above, in order to obtain a quality-controllable vibrating diaphragm, preferably the foaming magnification is controlled at a range of 1.5–2.5.

Figure 12:
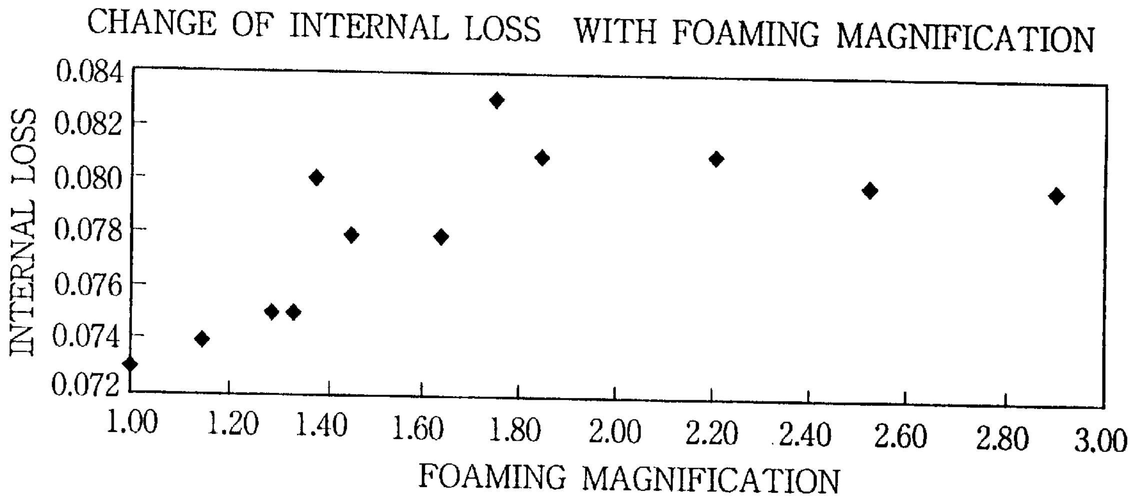
FIG. 12 is a graph indicating how the internal loss of the diaphragm of FIG. 1 changes with the foaming magnification thereof.

FIG. 12 is a graph indicating how the internal loss of the diaphragm of FIG. 1 changes with the foaming magnification thereof.

As is understood from the above description, the loudspeaker vibrating diaphragm produced in accordance with the present invention is low in specific gravity, has a low weight and a high rigidity. Further, since the loudspeaker vibrating diaphragm is formed as having a three-layer structure, with the foam layer disposed between and covered by the two un-foamed skin layers, the diaphragm has an excellent environment resistance. Moreover, since in thus produced diaphragm the foaming bubble cells are formed with their longer axes arranged in the thickness direction of the diaphragm, the two un-foamed skin layers become further reinforced, thereby improving the intensity of a vibrating diaphragm.

While the presently preferred embodiments of the this invention have been shown and described above, it is to be understood that these disclosures are for the purpose of illustration and that various changes and modifications may be made without departing form the scope of the invention as set forth in the appended claims.

What is claimed is:

1. A method of producing a loudspeaker vibrating diaphragm, said method comprising the steps of:

injecting an amount of resin containing a foaming agent into a metallic mold of an injection molding machine under a mold pressing force, said mold including a fixed part and movable part; and releasing the mold pressing force of the injection molding machine upon completion of the resin injection, so as to enlarge a space formed between the fixed part and the movable part by a predetermined distance in order to cause the foaming agent to foam the resin so as to obtain a foam layer in the diaphragm, wherein releasing the mold pressing force upon completion of the resin injection so as to enlarge the space formed between the fixed and movable parts results in bubbles formed in the foam layer having longer axes arranged in the thickness direction of the diaphragm.

2. The method according to claim 1, wherein the space formed between the fixed part and the movable part of the metallic mold is enlarged by a distance of 0.1–1.5 mm at a speed of 0.001 mm/ms or more.

3. The method according to claim 1, wherein the space is enlarged within 0.31 to 0.37 seconds after beginning of resin injection.

4. The method according to claim 1, wherein the space is enlarged by moving the movable part of said mold at a speed of 0.0020 to 0.0375 mm/ms.

5. The method according to claim 1, wherein a spring means is provided to assist in moving the movable part of said mold when the mold pressing force is released.

6. A method of producing a loudspeaker vibrating diaphragm, said method comprising the steps of:

injecting an amount of resin containing a foaming agent into a metallic mold of an injection molding machine under a mold pressing force, said mold including a fixed part having an internal surface and a movable part;

stopping the flow of the resin into the metallic mold upon completion of the resin injection, with the use of a shutter mechanism having a front portion, which mechanism is adapted to place the front portion in tight contact with the internal surface of the fixed part so as to stop the flow of resin; and reducing the mold pressing force of the injection molding machine after stopping the flow of resin, so as to enlarge a space formed between the fixed part and the movable part by a predetermined distance, so that the foaming agent foams the resin to obtain a foam layer in the diaphragm, wherein said shutter mechanism is closed to stop said resin flow and said mold pressing force is reduced while the injected resin is still in its flowable state, thereby allowing the foaming agent to foam the resin so as to obtain said foam layer.

7. The method according to claim 6, wherein the space formed between the fixed part and the movable part of the metallic mold is enlarged by a distance of 0.1–1.5 mm at a speed of 0.001 mm/ms or more.

8. The method according to claim 6, wherein the space is enlarged within 0.31 to 0.37 seconds after beginning of resin injection.

9. The method according to claim 6, wherein the space is enlarged by moving the movable part of said mold at a speed of 0.0020 to 0.0375 mm/ms.

10. The method according to claim 6, wherein a spring means is provided to assist in moving the movable part of said mold when the mold pressing force is released.

11. The method of claim 6, wherein the shutter mechanism is actuated with 0.34 to 0.38 seconds after the beginning of resin injection.

12. A method of producing a loudspeaker vibrating diaphragm, said method comprising the steps of:

injecting an amount of resin containing a foaming agent into a metallic mold of an injection molding machine under a mold pressing force, said metallic mold including a fixed part having an internal surface and a movable part;

stopping the flow of the resin into the metallic mold upon completion of the resin injection, with the use of a shutter mechanism having a front portion, which mechanism is adapted to place the front portion in tight contact with the internal surface of the fixed part so as to stop the flow of resin; and reducing the mold pressing force of the injection molding machine after stopping the flow of resin, so as to enlarge a space formed between the fixed part and the movable part by a predetermined distance, so that the foaming agent foams the resin to obtain a foam layer in the diaphragm, wherein releasing the mold pressing force upon completion of the resin injection so as to enlarge the space formed between the fixed and movable parts results in bubbles formed in the foam layer having longer axes arranged in the thickness direction of the diaphragm.

* * * * *